United States Patent [19]
Bennett

[11] Patent Number: 5,872,822
[45] Date of Patent: Feb. 16, 1999

[54] METHOD AND APPARATUS FOR MEMORY SEQUENCING

[75] Inventor: Dwayne R. Bennett, Scarboroough, Canada

[73] Assignee: McData Corporation, Broomfield, Colo.

[21] Appl. No.: 548,506

[22] Filed: Oct. 26, 1995

[51] Int. Cl.[6] .............................. H04L 27/10; H04L 7/00; H04L 12/28
[52] U.S. Cl. .......................... 375/372; 375/370; 375/356; 370/412; 370/413; 370/422
[58] Field of Search .................................. 375/372, 370, 375/371, 356, 354; 370/358, 397, 399, 466, 400, 392, 474, 102, 412, 413, 415–416, 422, 423; 348/497, 505

[56] References Cited

U.S. PATENT DOCUMENTS

| | | | |
|---|---|---|---|
| 4,823,365 | 4/1989 | Loginov | 375/372 |
| 4,928,275 | 5/1990 | Moore et al. | 370/102 |
| 5,131,013 | 7/1992 | Choi | 375/372 |
| 5,329,557 | 7/1994 | Suzuki et al. | 375/112 |
| 5,333,197 | 7/1994 | Febvre | 380/48 |
| 5,426,639 | 6/1995 | Follett et al. | 370/412 |
| 5,452,010 | 9/1995 | Doornink | 348/497 |
| 5,457,717 | 10/1995 | Bellamy | 375/372 |

*Primary Examiner*—Chi H. Pham
*Assistant Examiner*—Khai Tran
*Attorney, Agent, or Firm*—Stuart T. Langley, Esq.; William J. Kubida, Esq.; Holland & Hart LLP

[57] ABSTRACT

A method and apparatus for delaying frames received asynchronously from a fiber channel port until receive memory is properly sequenced for storing the delayed frames in which a circular buffer is positioned on the data path between the fiber channel port and the receive memory for delaying the frames in accordance with control signals generated by a sequencer having knowledge of the receive memory sequence count.

15 Claims, 6 Drawing Sheets

METHOD AND APPARATUS FOR MEMORY SEQUENCING

FIELD OF THE INVENTION

The present invention relates to methods and apparatus for taking frames that arrive asynchronously on a fibre channel network port and synchronizing them such that they can be stored into receive memory without the loss of data.

BACKGROUND OF THE INVENTION

Mainframes, super computers, mass storage systems, workstations and very high resolution display subsystems are frequently connected together to facilitate file and print sharing. Common networks and channels used for these types of connections may limit system performance by placing restraints on data flow rates, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions One type of communications interconnect that has been developed is Fibre Channel. The Fibre channel protocol was developed and adopted as the American National Standard for Information Systems (ANSI). See *Fibre Channel Physical and Signaling Interface*, Revision 4.2, American National Standard for Information Systems (ANSI) (1993) for a detailed discussion of the fibre channel standard. Briefly, fibre channel is a switched protocol that allows concurrent communication among workstations, super computers and various peripherals. The total network bandwidth provided by fibre channel is on the order of a terabit per second. Fibre channel is capable of transmitting frames at rates exceeding 1 gigabit per second in both directions simultaneously. It is also able to transport commands and data according to existing protocols such as Internet protocol (IP), small computer system interface (SCSI), high performance parallel interface (HIPPI) and intelligent peripheral interface (IPI) over both optical fiber and copper cable.

Essentially, the fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection device known as a fibre channel switch to connect devices. The fibre channel switch includes a plurality of fabric-ports (F_ports) that provide for interconnection and frame transfer between a plurality of node-ports (N_ports) attached to associated devices that may include workstations, super computers and/or peripherals. The fibre channel switch has the capability of routing frames based upon information contained within the frames. The N_port manages the simple point-to-point connection between itself and the fabric. The type of N_port and associated device dictates the rate that the N_port transmits and receives data to and from the fabric. Transmission is isolated from the control protocol so that different topologies (e.g., point-to-point links, rings, multidrop buses, cross point switches) can be implemented.

The Fibre Channel industry standard also provides for several different types of data transfers. A class 1 transfer requires circuit switching, i.e., a reserved data path through the network switch, and generally involves the transfer of more than one frame, oftentimes numerous frames, between two identified network elements. In contrast, a class 2 transfer requires allocation of a path through the network switch for each transfer of a single frame from one network element to another.

Frame switching for class 2 transfers is more difficult to implement than class 1 circuit switching as frame switching requires a memory mechanism for temporarily storing incoming frames prior to their routing to another port. A memory mechanism typically includes numerous input/output (I/O) connections with associated support circuitry. Additional complexity and hardware is required when channels carrying data at different bit rates are to be interfaced.

Thus, a heretofore unaddressed need exists in the industry for new and improved systems for implementing the Fibre Channel industry standard for class 2 transfers on fiber optic networks with much higher performance and flexibility than presently existing systems. Particularly, there is a significant need for a method and apparatus for transmission code decoding to handle two characters per clock cycle.

SUMMARY OF THE INVENTION

A preferred embodiment of the present invention provides for delaying frames received asynchronously from a fibre channel port until receive memory is properly sequenced for storing the delayed frames. A circular buffer is positioned on the data path between the fibre channel port and the receive memory for delaying the frames in accordance with control signals generated by a sequencer having knowledge of the receive memory sequence count.

The circular buffer may be embodied in an array of flip-flops synchronized by a sync pulse and actuated by the sequencer control signal to output the delayed frame to coincide with the clock cycle sequence for writing the frame to receive memory.

Other aspects and advantages of the present invention will be apparent from the following detailed description, taken in conjunction with the accompanying drawings, illustrating by way of example the principles of the invention.

DETAILED DESCRIPTION OF THE PREFERRED EMBODIMENTS
I. FIBRE CHANNEL SWITCH ARCHITECTURE

Figure 1:
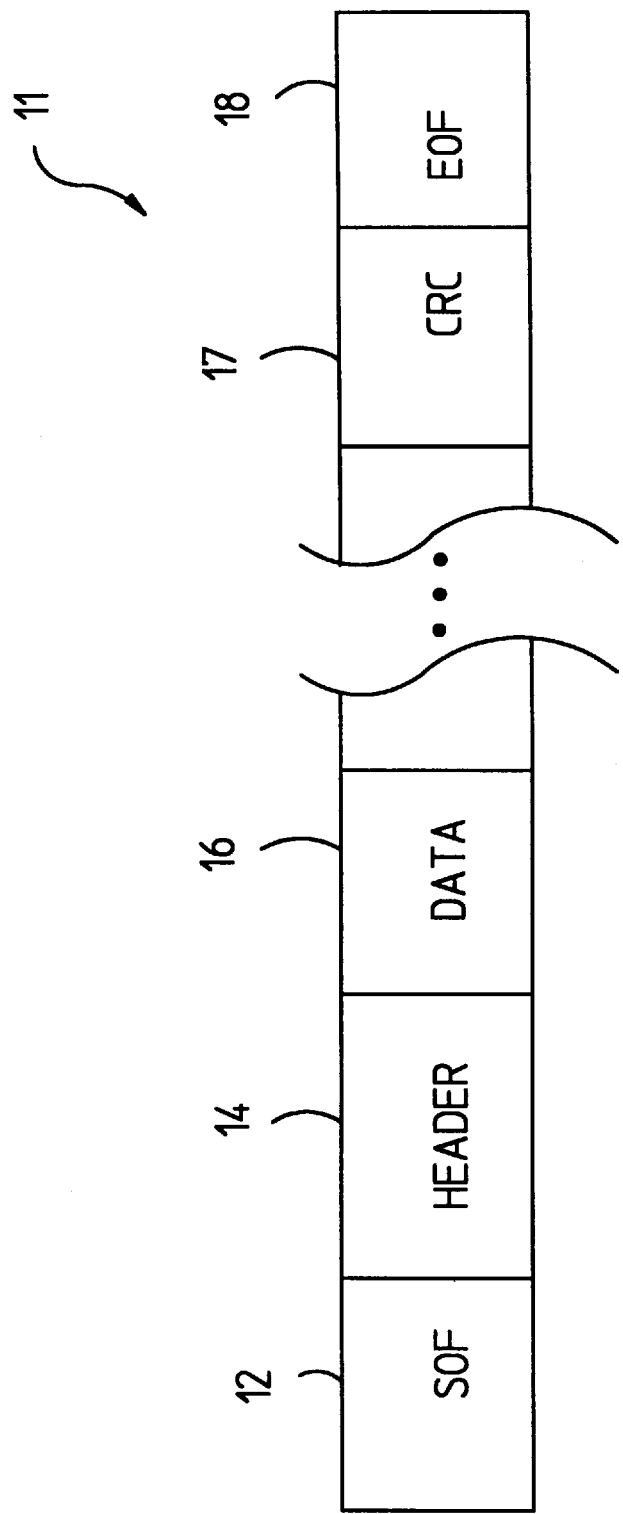
FIG. 1 is a schematic diagram of a prior art variable-length frame communicated through a fiber optic network in accordance with the Fibre Channel industry standard.

With reference now to the drawings wherein like reference numerals designate corresponding parts throughout the several views, a variable-length frame 11 is illustrated in FIG. 1. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

Figure 2:
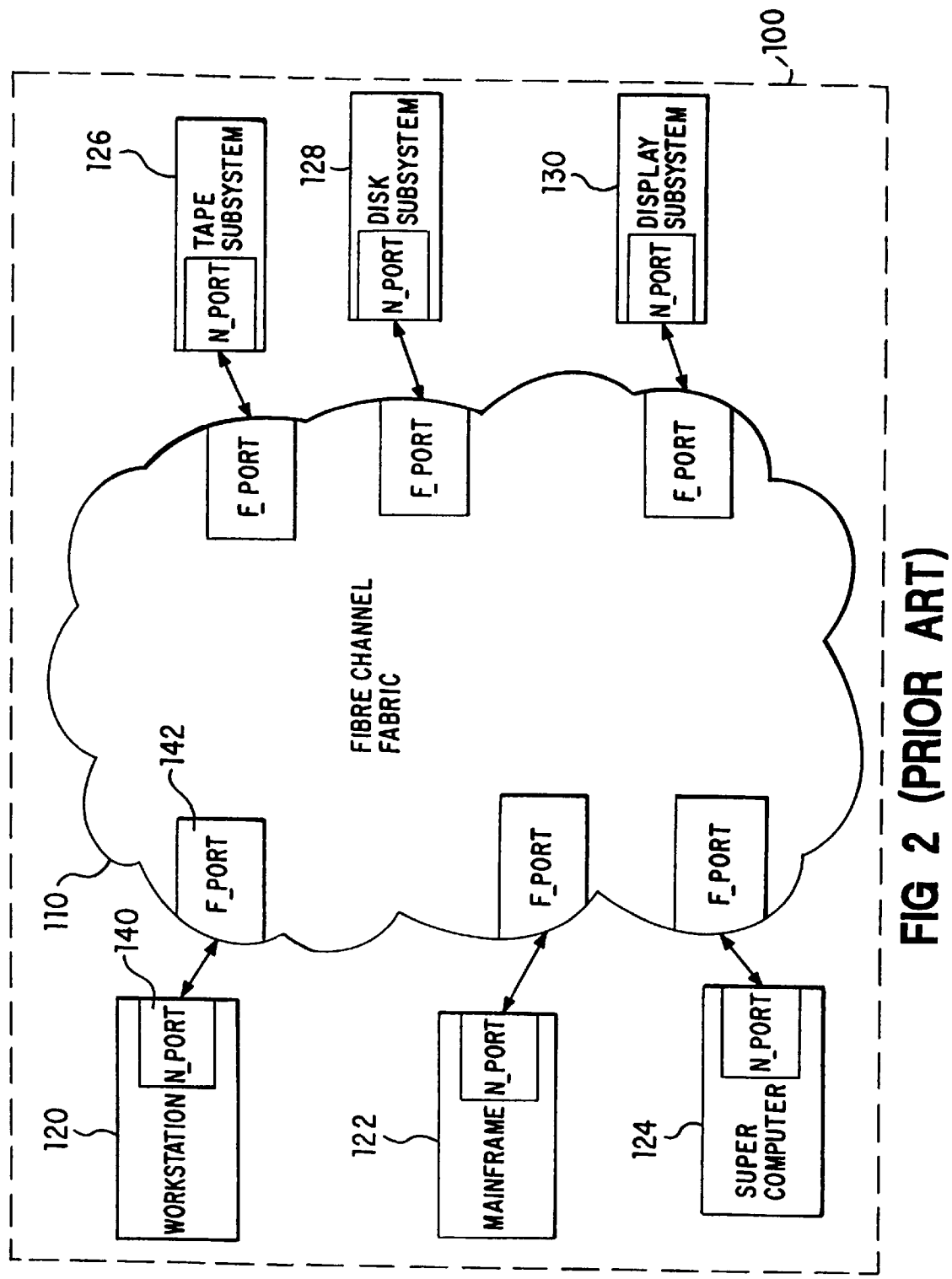
FIG. 2 shows a block diagram of a representative Fibre Channel architecture.

FIG. 2 illustrates a block diagram of a representative prior art fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110 (i.e. fiber channel switch). The fabric 110 is an entity that interconnects various node-ports (N_ports) and their associated workstations, mainframes and peripherals attached to the fabric 110 through the F_ports. The essential function of the fabric 110 is to receive frames of data from a source N_port and, using a first protocol, route the frames to a destination N_port. In a preferred embodiment, the first protocol is the fiber channel protocol. Other protocols, such as the asynchronous transfer mode (ATM) could be used without departing from the scope of the present invention.

As used herein, these terms and phrases are defined as follows:

Class 1 service—a circuit-switched connection;
Class 2 service—a frame-switched link providing guaranteed delivery and receipt notification;
Class 3 service—a frame-switched service with no confirmation;
F_port—"fabric" port, the access point of the Fabric that an N_port physically connects;
Fabric—a Fiber Channel-defined interconnection that handles routing in Fiber Channel networks;
Frame—a linear set of transmitted bits that define a basic transport element;
Intermix—a class of service that provides functionality of both Class 1 and 2, Intermix reserves the full channel for a Class 1 connection while allowing Class 2 traffic to pass on unused bandwidth;
Link—a communications channel;
N_port—"node" port, a Fiber Channel-defined hardware entity at the node end of a link.

Figure 3:
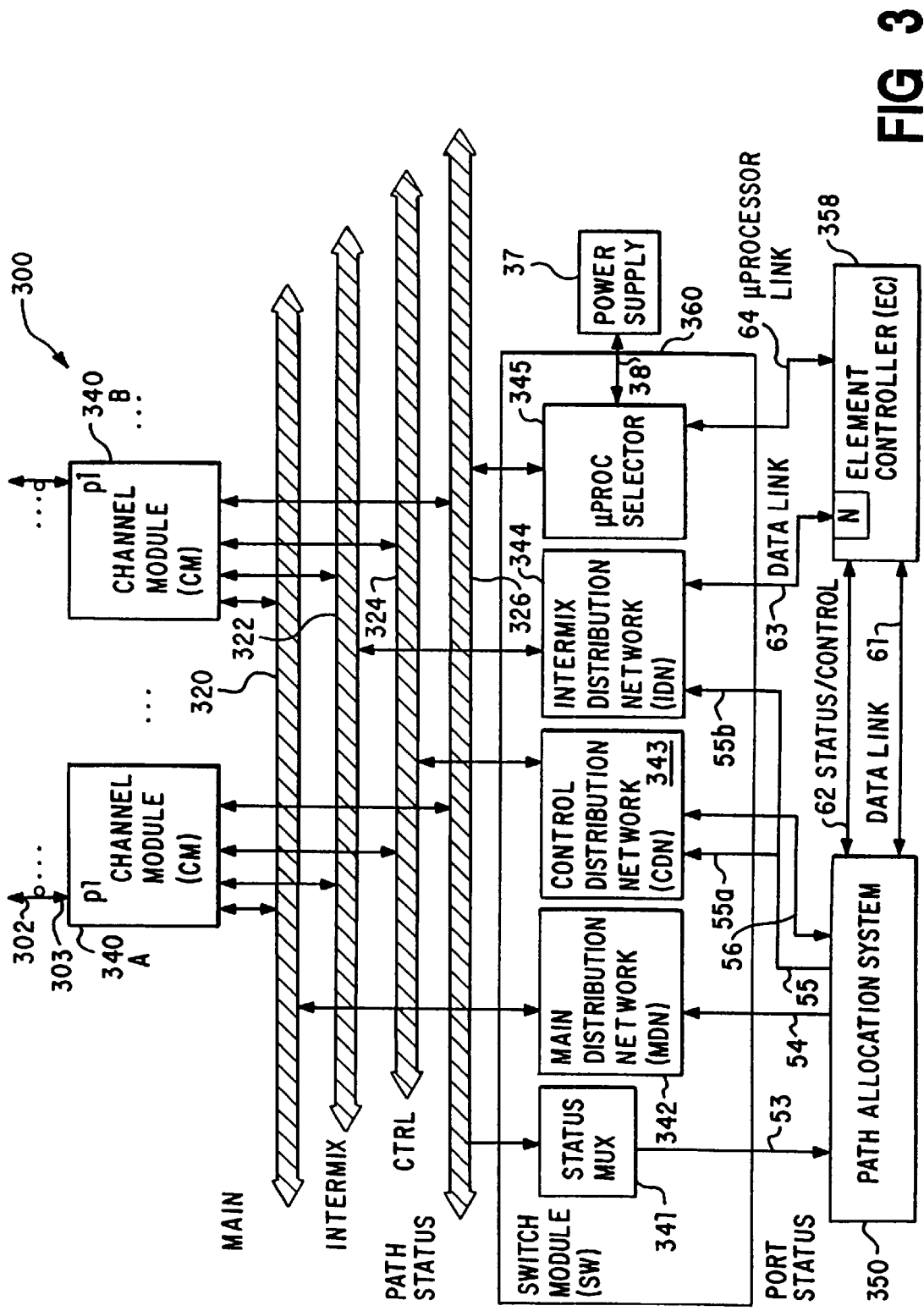
FIG. 3 is a schematic circuit diagram of the invention illustrating a high performance fiber optic switch constructed according to the present invention which utilizes a plurality of channel modules.

The fibre channel switch 300 illustrated in FIG. 3 employs a plurality of channel modules 340. Although FIG. 3 illustrates two channel modules 340 A and 340 B, the number of channel modules 340 may be greater than illustrated and is typically dependent upon system configuration. In a first embodiment, the fibre channel switch has four (4) channel module cards, each containing four 266 MBaud F_ports (providing for the interconnection of sixteen F_ports and associated computers and peripherals). The architecture provides for the substitution of the four 266 Mbaud channel module cards with either dual port 531 Mbaud channel module cards or a single port 1063 MBaud channel module. Each channel module 340 is coupled directly to a main link 320, an intermix link 322, a control link 324 and a path status link 326. Control signals over the control link 324 direct the transfer of frames received by one channel module 340 to a different port on the same channel module or to any other available channel module 340. The channel modules 340 provide port intelligence for data communication with the channels, buffered receive memory for temporarily storing frames for class 2 data transfers, as well as a bypass such that incoming frames are not buffered during class 1 data transfers. A path allocation system 350 communicates with the channel modules 340 through a switch module 360.

For frame-switched traffic (class 2), the path allocation system 350 collects frame header information for each frame from the receiving ports of channel module 340. The path allocation system 350 verifies the validity of the frame header information and allocates switch resources to set up a path for the frame, through the switch to the destination port. Once the frame has been forwarded, the path allocation is system 350 de-allocates the switch resources.

The path allocation system 350 also collects frame header information for circuit switched traffic (Class 1 connect frames) from the channel modules 340. The path allocation system 350 then verifies the validity of the connection and allocates switch resources to set up a dedicated path for the connection to follow. The connection traffic itself will de-allocate resources.

Figure 4:
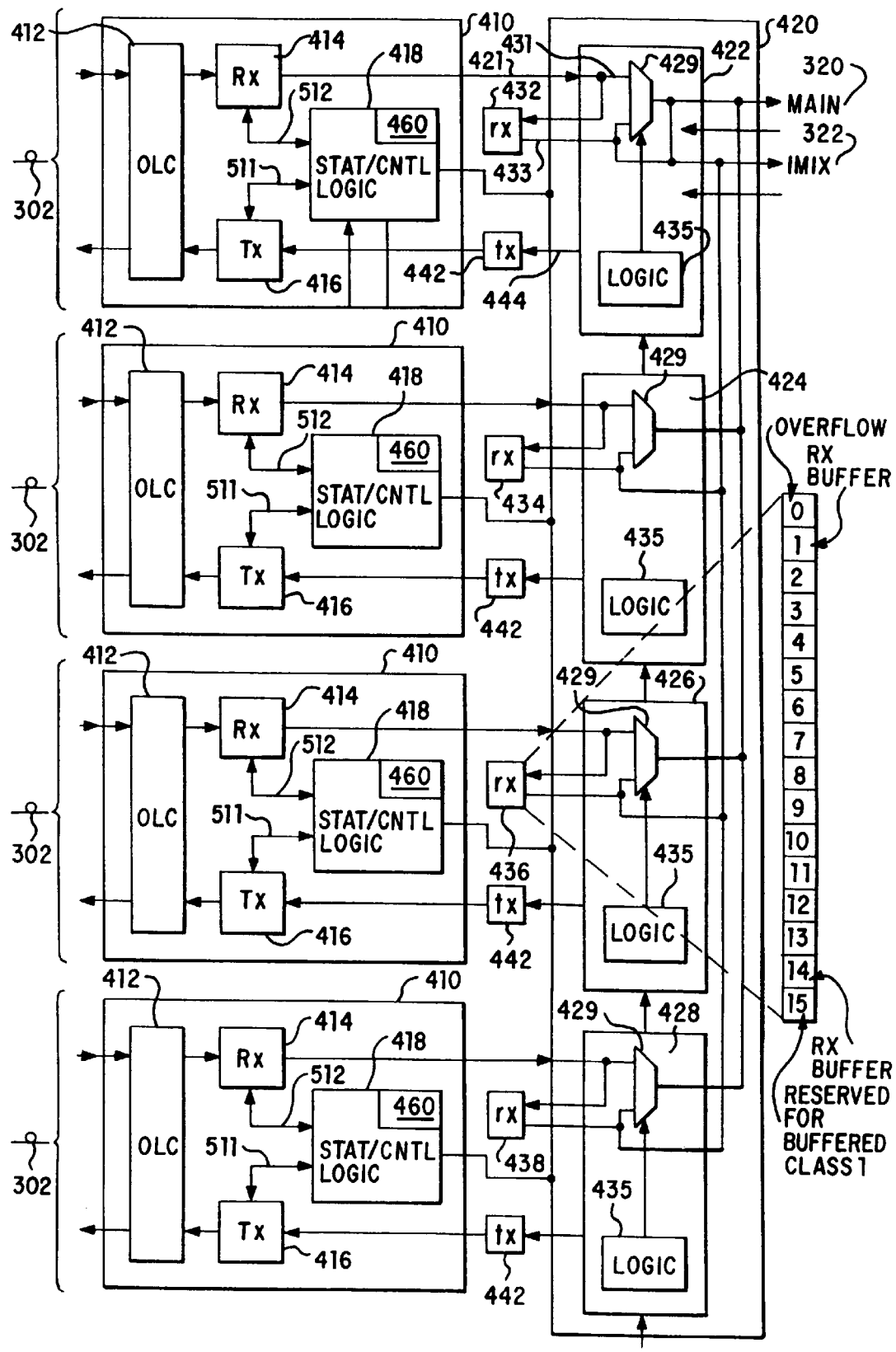
FIG. 4 shows a block diagram of one of the channel modules of FIG. 3.

FIG. 4 shows a block diagram of the channel module architecture for a quad port, 266 Mbaud channel module comprising four port intelligence systems 410 and a memory interface system 420 having four memory interface ASIC's 422, 424, 426 and 428. The architecture for a double port, 531 Mbaud channel module implementation would be similar, except that the 531 implementation employs two port intelligence modules 410. The architecture for a single port, 1062 Mbaud channel module implementation would be similar, except that the 1062 implementation employs four channel modules 410 coupled to the memory interface systems.

Each port intelligence system 410 is coupled to external N_ports through a GLM/OLC transceiver 412. Incoming frames are transferred by the GLM/OLC transceiver 412 to a receiver 414. Status/control logic circuit 418 recognizes when a new frame is received by the receiver 414 and determines the transfer class (either 1 or 2) as well as the length of data from the received frame header information attached to the frame. The purposes of the receiver 414 are to: maintain synchronization with the attached N_port; decode incoming transmission characters, to manage buffer-to-buffer flow control; gather statistics to evaluate link performance; re-time the system clock; detect, check, and validate frames; and forward all frames to the memory interface system 420 for temporary storage in associated receive memory 432, 434, 436 and 438.

The memory interface system 420, in response to commands from the port intelligence system 410 and the path allocation system 350, employs the four memory interface ASIC's 422, 424, 426 and 428 to interface four receive memories 432, 434, 436 and 438 (16k×16 external R) to internal switch data paths via the main bus 320 and imix bus 322. Frames transmitted across receive data path 421 between the port intelligence system 410 and the memory interface system 420 are bit sliced such that memory interface 422 receives bits 0–1, memory interface 424 receives bits 2–3, memory interface 426 receives bits 4–5 and memory interface 428 receives bits 6–7. Each memory interface knows its position and the baud rate at which the channel module 340 is operating. Frames read from receive memories 432, 434, 436, 438 are reassembled to become byte-wide for traversing the fibre channel switch on the main bus 320 and imix bus 322.

A transmitter 416 is coupled between the memory interface system 420 and the GLM/OLC transceiver 412 and transmits frames that have been forwarded from other channel module receive memories within the fibre channel switch for encoding and transmission according to fibre channel rules. A 4k×9 FIFO transmit memory 442 is coupled between the memory interface 420 and the transmitter 416 for interfacing the main bus 320 and imix bus 322 to the port intelligence system 410. The memory interface 420 outputs bit-sliced data that is reformed on the transmit data path 444 at the input of the transmit memory 442.

Each memory interface 422, 424, 426 and 428 includes a multiplexer 429 for providing class 1 data bypass via connection 431 and buffered storage for class 2 data transfers via connection 433 to the receive memory. Additionally, each memory interface includes a memory control logic 435 for controlling the multiplexers 429, the receive memories 432, 434, 436, 438 and the transmit memory 442 in response to commands from the port intelligence system 410 and the path allocation system 350 (FIG. 3).

Each receive memory 432, 434, 436 and 438 is comprised of a set of sixteen memory buffers numbered 0–15 (illustrated in the expanded portion 440 of FIG. 4), each having a storage capacity of two kbytes. Memory buffers numbered 1 through 14 are designated for frame transfers of class 2, memory buffer numbered 15 is reserved for class 1 frames destined for the embedded N_port on the element controller 358 (FIG. 3), and memory buffer number 0 is reserved for overflow. A maximum size frame in accordance with the Fiber Channel industry standard is 2148 bytes long. A binary addressing scheme "PPbbbbxxxxxxxx" is employed for the fourteen memory buffers numbered 1–14 and PP1111bbbbxxxx for the overflow memory buffer numbered 0, where PP identifies the F_port from which the frame is being transferred and bbbb identifies the memory buffer number at which it currently resides.

II. CIRCULAR BUFFER ARCHITECTURE

A preferred embodiment of the present invention provides for delaying frames received asynchronously from the fibre channel port until receive memory is properly sequenced for storing the delayed frames. A circular buffer is positioned on the data path between the fibre channel port and the receive memory for delaying the frames in accordance with control signals generated by a sequencer having knowledge of the receive memory sequence count.

As illustrated in FIG. 4, frames received asynchronously at port 302 are directed to receiver 414 and bit-sliced into two-bit data for distribution on the data path 421 to the ASIC's 422, 424, 426 and 428. Each ASIC includes a sixteen location circular buffer 423 (three-bits wide, two-bits data, one tag bit indicating the start and end of each frame) (shown in FIG. 5). The output of each circular buffer 423 is directed to an accumulator 425 (shown in FIG. 5) on each ASIC for accumulating eight sets of two-bit wide data into 16-bit wide data for storage in the corresponding receive memories 432, 434, 436 and 438. The logic 435 in each ASIC 422, 424, 426 and 428 further comprises a memory address sequencer 437 (shown in FIG. 5) that is synchronized to a common system sync pulse. Each sequencer 437 is aware of its position (0,1,2,3) in the memory interface 420, the baud rate (266, 531, or 1062) of the port intelligence mechanism 410 and the memory sequencer clock cycle (eight) sequence.

Figure 5:
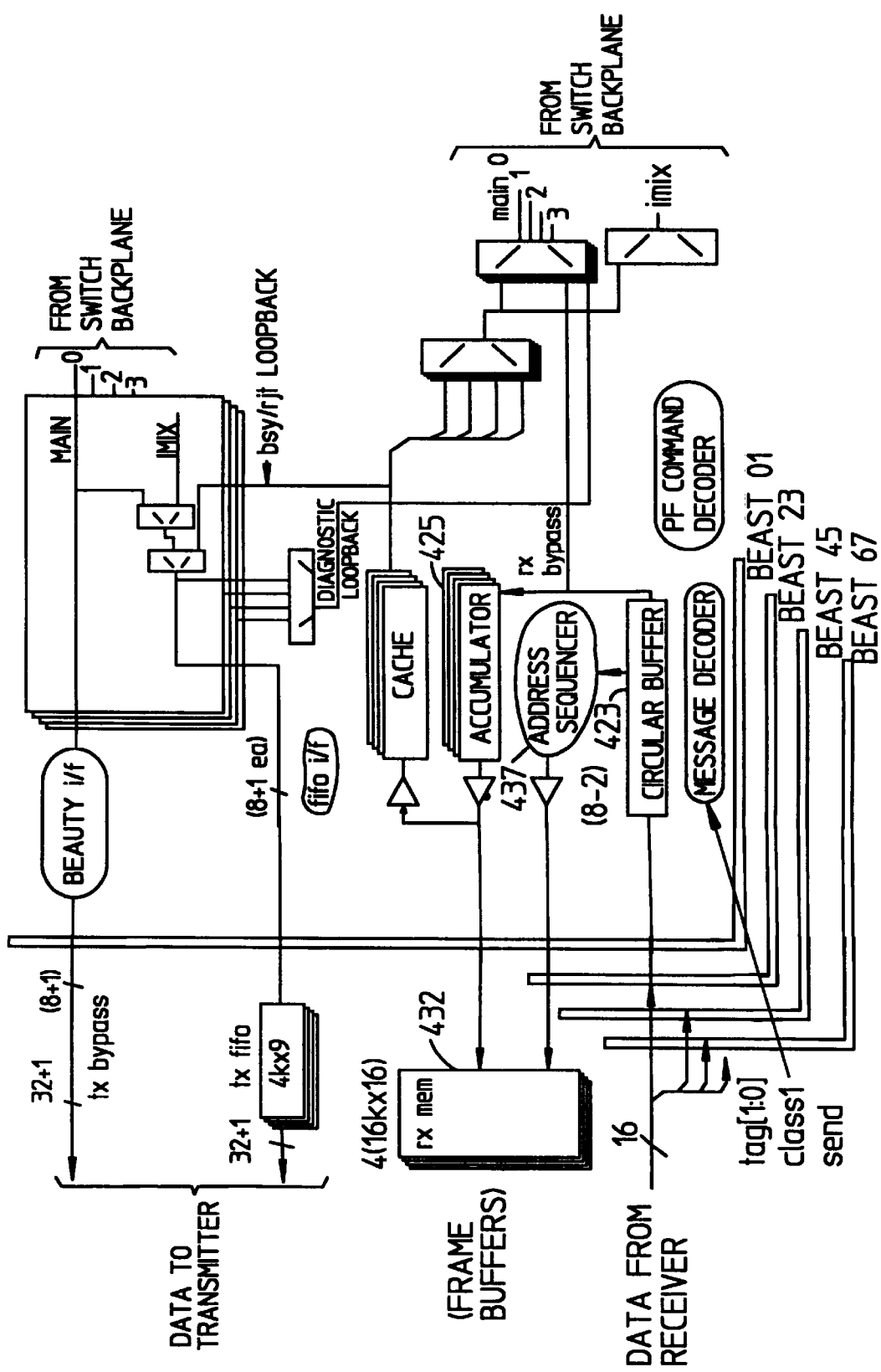
FIG. 5 is a block diagram of the invention illustrating the circular buffer, address sequencer and receive buffers.

FIG. 5 provides a more detailed view of the circular buffer 423, accumulator 425, address sequencer 437, and receive memories 432. The preferred embodiment of the invention is implemented in three arrays of sixteen "D-type" flip-flops 623 (shown in FIG. 6). The arrays of flip-flops are coupled to a system clock and the sequencer 437 to provide for a synchronous sequential circuit for delaying asynchronous frames received from the fibre channel.

Figure 6:
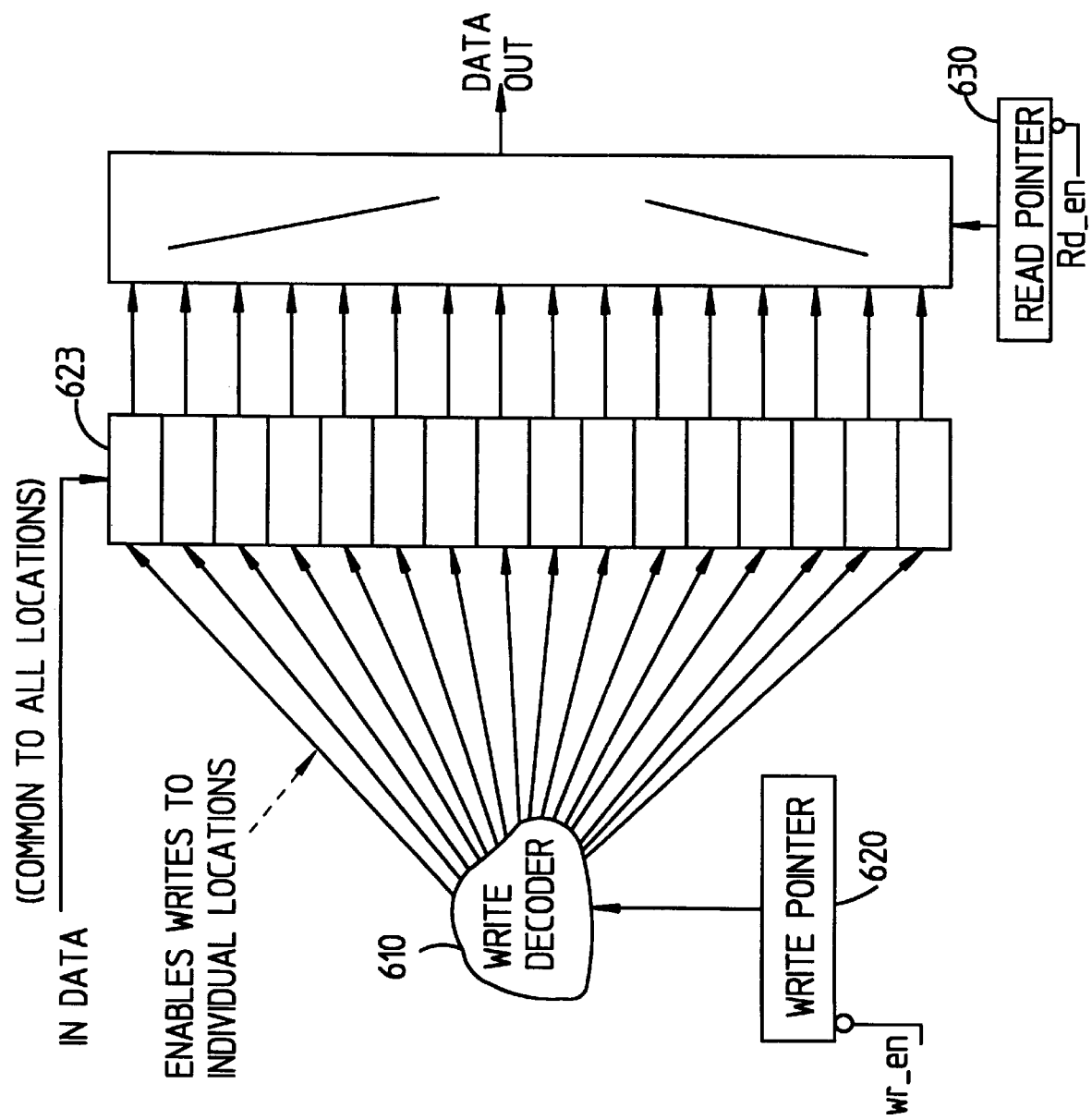
FIG. 6 is a detailed diagram of a circular buffer employed in the preferred embodiment of the invention.

FIG. 6 illustrates the operation of the circular buffer in which a write pointer ('wp') 620 controls a-write decoder 610 to write data into the 16 flip flops 623 of the circular buffer in accordance with a write enable signal (when 'wr_en' is active). The write enable signal is derived from the tag bits associated with valid frame data. A read pointer ('rp') is employed for designating the flip-flop to which data should be read out. The read pointer 630 advances through the circular buffer whenever the read enable ('rd_en') is active. The read enable signal is made active by the memory sequencer which determines when transfers to the accumulator occur. The passing of data to the accumulator is synchronized by providing a read enable to coincide with the time appropriate for sending data to memory.

At login, the write pointer 620 and the read pointer 630 are pointing at the same flip-flop. As data enters the circular buffer, the write pointer moves down through the 16 flip-flop locations to temporarily store data. Meanwhile, the read pointer is waiting for a signal from the address sequencer 437 to indicate the time is appropriate to start reading data from the flip flops. The first piece of data read out will be the first data written into the flip-flops. The read pointer follows the write pointer (with a delay), once the signal from the address sequencer is provided.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects.

I claim:

1. An apparatus for directing frames received asynchronously by a fibre channel port, synchronously into a receive memory, comprising:

a data path coupling the fibre channel port and the receive memory, the data path further comprising a circular buffer for synchronizing passing of a frame to the receive memory and a sequencer coupled to the receive memory and the circular buffer for generating control signals to control output of the frame from the circular buffer to be in sequence with a memory clock cycle sequence of the receive memory, wherein the frame is store synchronously in the receive memory.

2. The apparatus for directing frames received asynchronously by a fibre channel port into a receive memory synchronously as claimed in claim 1, the circular buffer further comprising an array of flip-flops, a write pointer for pointing to the flip-flop in which data is going to be stored, and a read pointer for pointing to the flip-flop from which data is to be read.

3. The apparatus for directing frames received asynchronously by a fibre channel port into a receive memory synchronously as claimed in claim 2, wherein the data path is two-bits wide, and further comprising an accumulator for accumulating the two-bit wide data into 16-bit wide data for storage in the receive memory.

4. The apparatus for directing frames received asynchronously by a fibre channel port into a receive memory synchronously as claimed in claim 3, wherein the sequencer is synchronized to a common system sync pulse to provide for storing the frame in the receive memory.

5. The apparatus for directing frames received asynchronously by a fibre channel port into a receive memory synchronously as claimed in claim 4, wherein the port includes a port intelligence mechanism and the sequencer is located in a memory interface with three other sequencers and the sequencer is aware of its position(0,1,2,3) in the memory interface relative to the other sequencers and the sequencer is aware of the baud rate of the port intelligence mechanism.

6. The apparatus for directing frames received asynchronously by a fibre channel port into a receive memory synchronously as claimed in claim 5, wherein passing of data to the accumulator is synchonized by providing a read pulse to flip-flops in the array to coincide with the memory cycle sequence appropriate for writing frames into the receive memory.

7. The apparatus for directing frames received asynchronously by a fibre channel port into a receive memory synchronously as claimed in claim 1, the circular buffer further comprises a 16×3 array of flip-flops having sixteen locations and three bits per location, coupled to a system clock to provide for a synchronous sequential circuit for delaying asynchronous frames entering the port intelligence system without regard to memory clock cycle requirements of the receive memory.

8. An apparatus for directing frames received asynchronously by a plurality of fibre channel ports identified as port 0, port 1, port 2 and port 3 into a receive memory synchronously, comprising:

a data path coupling each fibre channel port and the receive memory, wherein the data path is two-bits wide and each frame is bit-sliced in port 0, port 1, port 2 and port 3;

a circular buffer in the data path for synchronizing passing of a frame to the receive memory, the circular buffer further comprising an array of flip-flops, a write pointer for pointing to the flip-flop in which data is going to be stored, and a read pointer for pointing to the flip-flop from which data is to be read;

an accumulator in the data path for accumulating data from the two-bit wide data path into 16-bit wide data for storage in the receive memory;

a first sequencer located in a memory interface with three other sequencers and coupled to the receive memory and the circular buffer for generating control signals to control output of the frame from the circular buffer to be in sequence with a memory clock cycle sequence of the receive memory, wherein the frame is stored synchronously in the receive memory and the first sequencer is synchronized to a common system sync pulse to provide for storing the frame in the receive memory, wherein passing of data to the accumulator is synchronized by providing a read pulse to flip-flops in the array to coincide with the memory cycle sequence appropriate for writing frames into the receive memory:

a port intelligence mechanism associated with each fibre channel port, wherein the first sequencer is aware of its position (0,1,2,3) in the memory interface relative to the three other sequencers and the first sequencer is aware of the baud rate of the port intelligence mechanism, wherein frames are stored in the circular buffer in the same distributed format regardless of port speed.

9. The apparatus for directing frames received asynchronously by a fibre channel port into a receive memory synchronously as claimed in claim 8, wherein the sequencer provides four write signals (wr) for ports 0 through 3, followed by four read signals (rd) and a frame received by the port is bit-sliced into two-bit segments and a tag bit (the tag bit goes high to indicate the presense of a frame) and input across the four circular buffers by the succession of four write signals.

10. The apparatus for directing frames received asynchronously by a fibre channel port into a receive memory synchronously as claimed in claim 9, wherein the sequencer generates the following memory control signals: Tag Bit, Data From Port, Data In, Write Pointer, Read Pointer and Data Out.

11. The apparatus for directing frames received asynchronously by a fibre channel port into a receive memory, synchronously as claimed in claim 10, wherein the Read Pointer tracks when a frame is read out of the circular buffer to properly time sequence the writing of the frame into memory.

12. The apparatus for directing frames received asynchronously by a fibre channel port into a receive memory synchronously as claimed in claim 11, wherein the delay required to synchronize the frame being written into the memory is equal to the difference between when the write pointer becomes active and when the read pointer becomes active.

13. The apparatus for directing frames received asynchronously by a fibre channel port into a receive memory synchronously as claimed in claim 12, wherein the delay is a function of the arrival time of the frame and the current state of the sequencer such that if the difference between the value of the Write pointer and the Read Pointer is one, then the circular buffer is currently empty (no data being read out or being written in), and if the difference is five, the frame is currently being read out.

14. A method for directing frames received asynchronously by a fibre channel port, synchronously into a receive memory, comprising the method steps of:

coupling the fibre channel port to the receive memory over a data path, the data path further comprising a circular buffer, temporarily storing a frame in the circular buffer, sychronizing the passing of the frame from the circular buffer to the receive memory to coincide with a memory clock cycle sequence of the receive memory, wherein the frame is stored sychronously in the receive memory.

15. The method for directing frames received asynchronously by a fibre channel port as claimed in claim 14, further comprising the step of accumulating two-bit wide data into 16-bit wide data for storage in the receive buffers.

* * * * *

UNITED STATES PATENT AND TRADEMARK OFFICE
CERTIFICATE OF CORRECTION

PATENT NO. : 5,872,822
DATED : February 16, 1999
INVENTOR(S) : Dwayne R. Bennett It is certified that error appears in the above-identified patent and that said Letters Patent is hereby corrected as shown below:

On the Title page, item [57] References Cited, the following should be added:

U. S. PATENT DOCUMENTS

| EXAMINER INITIAL | | PATENT NUMBER | | | | | ISSUE DATE | PATENTEE | CLASS | SUBCLASS | FILING DATE IF APPROPRIATE |
|---|---|---|---|---|---|---|---|---|---|---|---|
| | | 5 | 2 | 9 | 9 | 3 | 1 | 3 | 3/29/94 | Petersen et al. | 395 | 200.64 | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 2 | 3 | 9 | 9 | 3 | 7 | 10/7/87 | EPO | | | X | |

Signed and Sealed this

Thirty-first Day of October, 2000

Attest:

Q. TODD DICKINSON

*Attesting Officer*    *Director of Patents and Trademarks*